US 7,403,881 B2

(12) United States Patent
Magee et al.

(10) Patent No.: US 7,403,881 B2
(45) Date of Patent: Jul. 22, 2008

(54) FFT/IFFT PROCESSING SYSTEM EMPLOYING A REAL-COMPLEX MAPPING ARCHITECTURE

(75) Inventors: David P. Magee, Plano, TX (US); Ralph E. Payne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 556 days.

(21) Appl. No.: 10/973,751

(22) Filed: Oct. 26, 2004

(65) Prior Publication Data

US 2006/0089822 A1    Apr. 27, 2006

(51) Int. Cl.
*G06F 17/10* (2006.01)
(52) U.S. Cl. .............................. 703/2; 703/13; 370/210
(58) Field of Classification Search ..................... 703/2, 703/13, 14; 370/210, 267; 708/404
See application file for complete search history.

(56) References Cited

U.S. PATENT DOCUMENTS

| | | | |
|---|---|---|---|
| 5,987,005 A | 11/1999 | Fertner et al. | |
| 6,169,723 B1 | 1/2001 | Fertner et al. | |
| 7,024,443 B2 * | 4/2006 | Davey et al. | 708/404 |
| 7,072,411 B1 * | 7/2006 | Dollard | 375/260 |
| 2005/0053169 A1 * | 3/2005 | Jia et al. | 375/267 |
| 2005/0058059 A1 * | 3/2005 | Amer | 370/210 |

OTHER PUBLICATIONS

"Implementation of a Programmable 64-2048-Point FFT/IFFT {rpcesspr fpr PFDM-Based Communications Systems", Kuo et al, IEEE 0-7803-7761-3/03, IEEE 2003.*
Smith, Winthrop W.; Handbook of Real-Time Fast Fourier Transforms; IEEE Press, 1995.
Singleton, Richard C.; Algor Procedures for the Fast Fourier Transform; Communications of the ACM; vol. 11, No. 11; Nov. 1968; pp. 773-776.

* cited by examiner

*Primary Examiner*—Russell Frejd
(74) *Attorney, Agent, or Firm*—Steven A. Shaw; W. James Brady; Frederick J. Telecky, Jr.

(57) ABSTRACT

The present invention provides an FFT/IFFT processor for use with N data values. In one embodiment, the FFT/IFFT processor includes an even-odd data mapper configured to provide a mapping of the N data values into N/2 mapped complex data values if the N data values are real. Additionally, the FFT/IFFT processor also includes a separator-combiner, coupled to the even-odd data mapper, configured to compute either an FFT based on the mapping or an IFFT based on the N data values if the N data values are complex.

7 Claims, 3 Drawing Sheets

FFT/IFFT PROCESSING SYSTEM EMPLOYING A REAL-COMPLEX MAPPING ARCHITECTURE

TECHNICAL FIELD OF THE INVENTION

The present invention is directed, in general, to FFT and IFFT conversion and, more specifically, to an FFT/IFFT processor, a method of FFT/IFFT processing and an FFT/IFFT processing system employing the processor or the method.

BACKGROUND OF THE INVENTION

Communication systems extensively employ digital signal processing techniques to accomplish increasingly more sophisticated and complex computational algorithms. Expanding applications are being fueled by new technologies and increasing demand for products and services. The Discrete Fourier Transform (DFT) is employed in many of these applications to provide a needed transformation between sampled time-domain signals (that are usually digitized) and their frequency-domain equivalents. The DFT may be calculated in three different ways. A set of simultaneous equations can be employed, but this technique is too inefficient to be of practical use. Correlation techniques can also be used, but computational requirements make this technique cumbersome or expensive to implement on a broad scale.

The Fast Fourier Transform (FFT) is an ingenious algorithm first discovered by Karl Friedrich Gauss, the great German mathematician of a century ago, and rediscovered and applied by J. W. Cooley and J. W. Tukey in 1965. The FFT is typically hundreds of times faster than the other DFT methods mentioned above and is therefore the algorithm of choice for a broad spectrum of applications employing the DFT. For example, the FFT is a critical element of a digital communication system that employs Orthogonal Frequency Division Multiplexing (OFDM) or Discrete Multitone (DMT) techniques.

The FFT is based on a "divide and conquer" model that decomposes a DFT into N points, which actually correspond to N separate DFTs consisting of a single point. The whole transform is then obtained from these simpler transforms. For example, an N-point DFT computation can be divided into two N/2-point DFT computations that can be further divided into two N/4-point DFT computations, and so on until complete. Actually, the division occurs after a reorganization of the points, such that each point corresponds to a two-point DFT in each position when using a method based on radix-2. After this division and DFT computation, a merging process is performed in which the simpler DFT transforms are reassembled into the complete DFT transform. Of course, the Inverse Fast Fourier Transform (IFFT) also advantageously appropriates these techniques to provide transformation between frequency domain data and time domain data.

An input of N real data values may be processed by an N point FFT to provide an output of N complex data values. Conversely, an input of N complex data values may be processed by an N point IFFT to provide an output of N real data values. A basic computational element that is advantageously employed to further enhance the benefits of FFT/IFFT processing is called a butterfly structure. The butterfly structure accepts two complex input numbers and performs one complex multiplication, one complex addition and one complex subtraction to produce two complex output numbers. However, as N increases in magnitude, the number of complex multiplications required increases nonlinearly thereby placing additional burdens on processing and storage requirements.

Accordingly, what is needed in the art is a more effective way to provide N point FFT/IFFT computations employing real data.

SUMMARY OF THE INVENTION

To address the above-discussed deficiencies of the prior art, the present invention provides an FFT/IFFT processor for use with N data values. In one embodiment, the FFT/IFFT processor includes an even-odd data mapper configured to provide a mapping of the N data values into N/2 mapped complex data values if the N data values are real. Additionally, the FFT/IFFT processor also includes a separator-combiner, coupled to the even-odd data mapper, configured to compute either an FFT based on the mapping or an IFFT based on the N data values if the N data values are complex.

In another aspect, the present invention provides a method of FFT/IFFT processing for use with N data values. The method includes providing a mapping of the N data values into N/2 mapped complex data values if the N data values are real, and computing either an FFT based on the mapping or an IFFT based on the N data values if the N data values are complex.

The present invention also provides, in yet another aspect, an FFT/IFFT processing system. The FFT/IFFT processing system includes a memory having N data values; and an FFT/IFFT processor coupled to the memory. The FFT/IFFT processor has an even-odd data mapper that provides a mapping of the N data values into N/2 mapped complex data values if the N data values are real. The FFT/IFFT processor also has a separator-combiner, coupled to the even-odd data mapper, that computes either an FFT based on the mapping or an IFFT based on the N data values if the N data values are complex.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
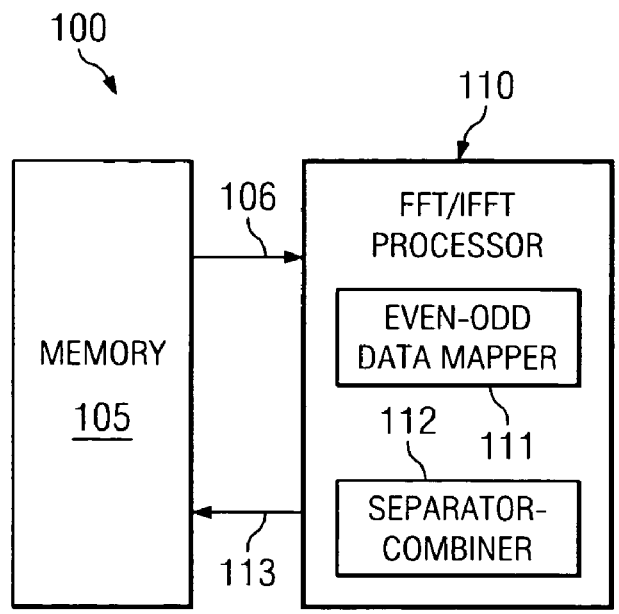
FIG. 1 illustrates a diagram of an embodiment of an FFT/IFFT processing system constructed in accordance with the principles of the present invention.

Referring initially to FIG. 1, illustrated is a diagram of an embodiment of an FFT/IFFT processing system, generally designated 100, constructed in accordance with the principles of the present invention. The FFT/IFFT processing system 100 includes a memory 105 and an FFT/IFFT processor 110 coupled to the memory 105 through a data input 106 and a data output 113. The FFT/IFFT processor 110 includes an even-odd data mapper 111 and a separator-combiner 112. The memory 105 provides storage for N input data values. In the illustrated embodiment, the memory 105 also provides storage for output data associated with the data output 113, as shown.

When the N input data values are real, they are organized into N/2 even and odd value sets. The even-odd data mapper 111 provides a mapping of the N/2 even and odd value sets of the N real input data values into N/2 mapped complex data values having N/2 real and imaginary parts. This mapping may occur in one of two ways. In a first mapping strategy, the N/2 even value sets are mapped into the N/2 real parts of the N/2 mapped complex data values, and the N/2 odd value sets are mapped onto the N/2 imaginary parts. In a second mapping strategy, the N/2 even value sets are mapped into the N/2 imaginary parts of the N/2 mapped complex data values, and the N/2 odd value sets are mapped into the N/2 real parts.

The separator-combiner 112 is coupled to the even-odd data mapper 111 and employs the N/2 mapped complex data values to compute an FFT based on the mapping provided, since the N real data values represent time domain data. Alternatively, when the N data values are complex and represent frequency domain data, the separator-combiner 112 provides an IFFT based on the N input data values, which are organized into N/2 complex values. Additionally, the separator-combiner 110 employs a first set of complex scalar values for the FFT calculation and a second set of complex scalar values for the IFFT calculation. A separation-combination processing unit and a transformation processing unit are employed within the separator-combiner 110. Their positioning in the data-flow depends on whether an FFT or an IFFT configuration is being employed by the separator-combiner 112.

For N real data values x[n] representing the time domain, a frequency domain representation X[k] may be computed using the FFT configuration. An N/2 complex sequence z[n] may be defined from the time domain N real data values x[n] as:

$$z[n] = x[2n] + j*x[2n+1], \text{ for } 0 \le n \le \frac{N}{2} - 1 \quad (1)$$

where the first mapping strategy is employed (even to real and odd to imaginary). The FFT of this sequence may be written as:

$$Z[k] = \sum_{n=0}^{N/2-1} z[n] W_{N/2}^{nk}, \quad (2)$$

where $W_n = e^{-j\frac{2\pi}{N}}$. Then, it can be shown that:

$$X[k] = X_2[k] + W_N^k X_1[k], \quad (3)$$

where $$X_1[k] = -\frac{j}{2}\left(Z[k] - Z*\left[\frac{N}{2} - k\right]\right), \text{ and} \quad (4a)$$

$$X_2[k] = \frac{1}{2}\left(Z[k] + Z*\left[\frac{N}{2} - k\right]\right). \quad (4b)$$

Therefore, after computing an N/2 point FFT according to equation (2), the FFT of the real data sequence may be found using equations (4a) and (4b).

The IFFT of a complex sequence whose time domain representation is known to be real may benefit from this architecture, as well. Given the frequency domain representation X[k], it may be shown that $$Z[k] = Z_2[k] + W_N^{-k} Z_1[k], \quad (5)$$

where $$Z_1[k] = \frac{j}{2}\left(X[k] - X*\left[\frac{N}{2} - k\right]\right), \text{ and} \quad (6a)$$

$$Z_2[k] = \frac{1}{2}\left(X[k] + X*\left[\frac{N}{2} - k\right]\right). \quad (6b)$$

Then, by performing an N/2 point IFFT on Z[k], the time domain sequence z[n] can be generated employing equation (7) below:

$$z[n] = \sum_{k=0}^{N/2-1} Z[k] W_{N/2}^{-nk}. \quad (7)$$

In this illustration, an N/2 point IFFT architecture is employed to compute the N point IFFT, which generates a time domain sequence that is real. Additionally, the output data corresponding to equation (7) will have the same data ordering as in equation (1) above.

Analogously, employing the second mapping strategy (even to imaginary and odd to real) for the time domain N real data values x[n], a frequency domain representation X[k] may again be computed using the FFT configuration. An N/2 complex sequence z[n] may be defined from the time domain N real data values x[n] as:

$$z[n] = x[2n+1] + j*x[2n], \text{ for } 0 \le n \le \frac{N}{2} - 1. \quad (8)$$

The FFT of this sequence may be written as:

$$Z[k] = \sum_{n=0}^{N/2-1} z[n] W_{N/2}^{nk} \quad (9)$$

where $W_N = e^{-j\frac{2\pi}{N}}$. Again, it can be shown that:

$$X[k] = X_2[k] + W_N^k X_1[k] \quad (10)$$

where $$X_1[k] = \frac{1}{2}\left(Z[k] + Z*\left[\frac{N}{2} - k\right]\right), \text{ and} \quad (11a)$$

$$X_2[k] = -\frac{j}{2}\left(Z[k] - Z*\left[\frac{N}{2} - k\right]\right). \quad (11b)$$

Therefore, after computing an N/2 FFT according to equation (9), the FFT of the real data sequence may be found using equations (11a) and (11b).

Again, the IFFT of a complex sequence whose time domain representation is known to be real and given the frequency domain representation X[k], it may be shown that:

$$Z[k] = Z_2[k] + W_N^{-k} Z_1[k], \quad (12)$$

where $$Z_1[k] = \frac{1}{2}\left(X[k] - X*\left[\frac{N}{2} - k\right]\right), \text{ and} \quad (13a)$$

$$Z_2[k] = \frac{j}{2}\left(X[k] + X*\left[\frac{N}{2} - k\right]\right). \quad (13b)$$

By performing an N/2 point IFFT on Z[k], the time domain sequence z[n] can be generated employing equation (14) below:

$$z[n] = \sum_{k=0}^{N/2-1} Z[k] W_{N/2}^{-nk}. \quad (14)$$

As before, the output data corresponding to equation (14) will have the same data ordering as in equation (8) above. Again, an N/2 point IFFT architecture is employed to compute the N point IFFT, which generates a time domain sequence that is real.

Figure 2:
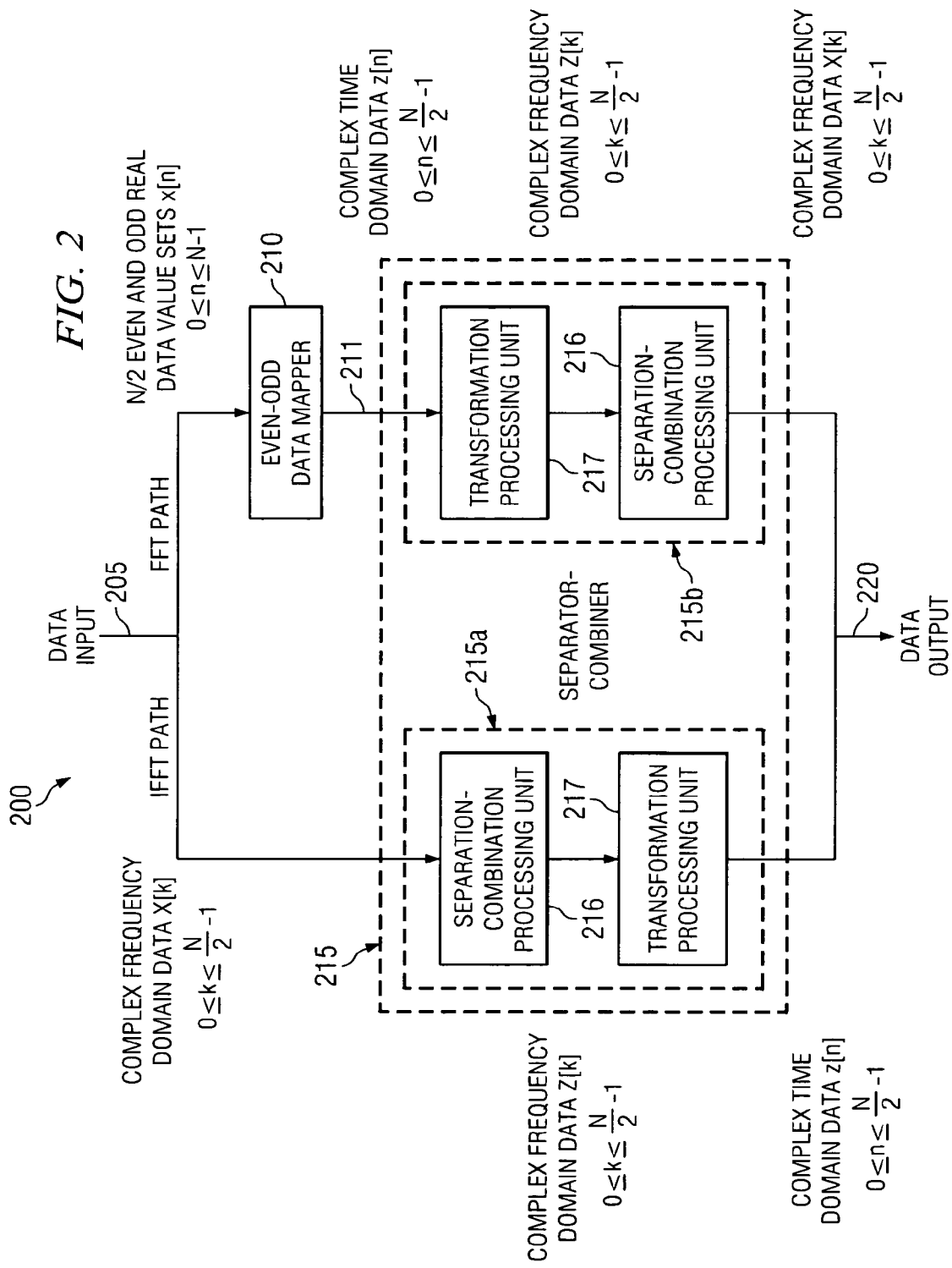
FIG. 2 illustrates a block diagram of an embodiment of an FFT/IFFT processor constructed in accordance with the principles of the present invention.

Turning now to FIG. 2, illustrated is a block diagram of an embodiment of an FFT/IFFT processor, generally designated 200, constructed in accordance with the principles of the present invention. The FFT/IFFT processor 200 includes a data input 205, an even-odd data mapper 210 and a separator-combiner 215 having a mapped data input 211 and a data output 220. The even-odd data mapper 210 receives N real data values organized into N/2 even and odd value sets on the data input 205. These N/2 even and odd value sets are mapped into N/2 mapped complex data values and provided to the separator-combiner 215 over the mapped data input 211.

Figure 3:
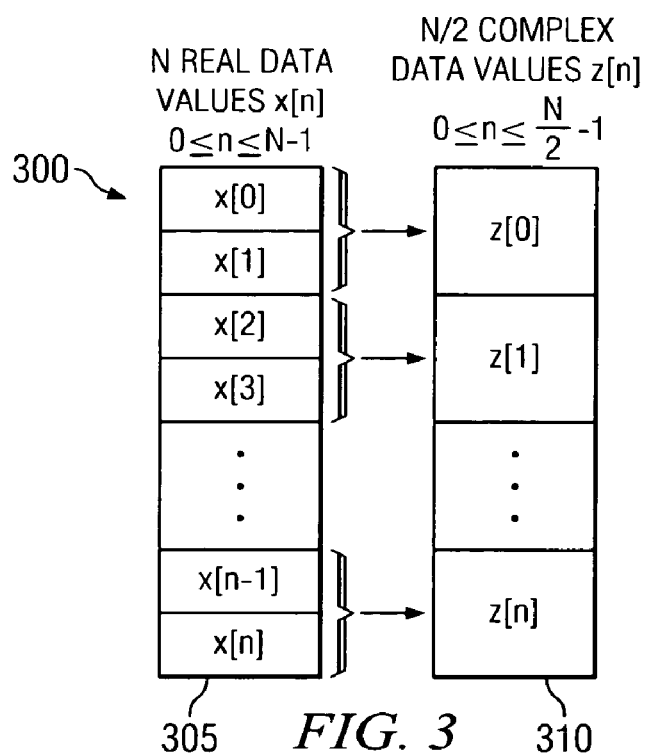
FIG. 3 illustrates an embodiment of a mapping diagram as may be associated with the even-odd data mapper of FIG. 2.

Turning momentarily to FIG. 3, illustrated is an embodiment of a mapping diagram, generally designated 300, as may be associated with the even-odd data mapper 210 of FIG. 2. The mapping diagram 300 includes a set of real data values 305, which are representative of input data to the even-odd data mapper 210. Additionally, the mapping diagram 300 includes a corresponding set of complex data values 310, which are representative of mapped data presented to the separator-combiner 215 on the mapped data input 211 of FIG. 2.

The set of real data values 305 includes N real data values x[n], and the corresponding set of complex data values 310 includes N/2 complex data values z[n]. The mapping diagram 300 indicates that a first even and odd data set x[0], x[1] is mapped into a corresponding first complex data value z[0]. As shown in FIG. 3, this mapping arrangement continues until a final even and odd data set x[n−1], x[n] is mapped into a final complex data value z[n].

This even-odd data mapping may employ the first mapping strategy or the second mapping strategy, as was discussed with respect to FIG. 1. As shown in equations (1) and (8), the first and second mapping strategies determine the relationship between the real and complex data. This relationship is summarized again in Table 1, below.

TABLE 1

| Data Mapping | Relationship Between Real & Complex Data |
|---|---|
| Even to Real Odd to Imaginary | z[n] = x[2n] + j * x[2n + 1] |
| Even to Imaginary Odd to Real | z[n] = x[2n + 1] + j * x[2n] |

Returning now to FIG. 2, the separator-combiner 215 includes a separation-combination processing unit 216 and a transformation processing unit 217. Illustrated are examples of the separator-combiner 215 organized into each of two possible configurations employing the same separation-combination processing and transformation processing units 216, 217. An IFFT configuration 215a is employed when input data represents the frequency domain, and an FFT configuration 215b is employed when input data represents the time domain. As may be seen in FIG. 2, the separation-combination processing unit 216 is employed before the transformation processing unit 217 for IFFT calculations, and after the transformation processing unit 217 for FFT calculations.

Figure 4:
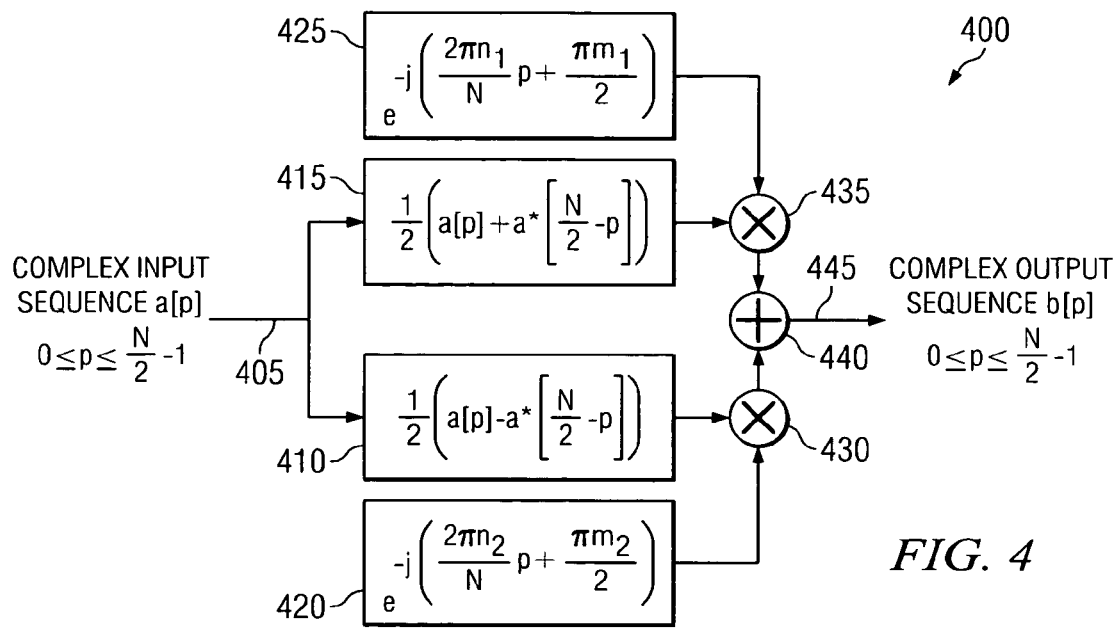
FIG. 4 illustrates a functional diagram of an embodiment of a separation-combination processing unit as may be associated with the separator-combiner of FIG. 2.

Turning momentarily to FIG. 4, illustrated is a functional diagram of an embodiment of a separation-combination processing unit, generally designated 400, as may be associated with the separator-combiner 215 of FIG. 2. The separation-combination processing unit 400 includes first and second processing units 410, 415 having a separation-combination (SC) data input 405, first and second complex scaling units 420, 425, first and second multipliers 430, 435 and a summing junction 440 coupled to an SC data output 445.

The first and second processing units 410, 415 receive input data from the SC data input 405, as shown. Respective outputs of the first processing unit 410 and the first complex scaling unit 420 are multiplied together in the first multiplier 430 and provided to the summing junction 440. Similarly, respective outputs of the second processing unit 415 and the second complex scaling unit 425 are multiplied together in the second multiplier 435 and also provided to the summing junction 440. The summing junction 440 sums these two outputs to provide the SC data output 445.

The separation-combination processing unit 400 accepts a complex input sequence a[p] on the SC data input 405 and provides a complex output sequence b[p] on the SC data output 445. If the separator-combiner 215 is employed in the IFFT configuration 215a, the complex input sequence a[p] represents complex frequency domain data X[k] and the complex output sequence b[p] represents complex frequency domain data Z[k] as denoted in FIG. 2. The first processing unit 410 is associated with equation (6a) for the first mapping strategy and equation (13a) for the second mapping strategy, as discussed with respect to FIG. 1. Analogously, the second processing unit 415 is associated with equation (6b) for the first mapping strategy and equation (13b) for the second mapping strategy.

However, if the separator-combiner 215 is employed in the FFT configuration 215b, the complex input sequence a[p] represents complex frequency domain data Z[k] and the complex output sequence b[p] represents complex frequency domain data X[k] as also denoted in FIG. 2. For this configuration, the first processing unit 410 is associated with equation (4a) for the first mapping strategy and equation (11b) for the second mapping strategy, as discussed with respect to FIG. 1. Analogously, the second processing unit 415 is associated with equation (4b) for the first mapping strategy and equation (11a) for the second mapping strategy.

The first and second complex scaling units 420, 425 provide scaling factors that are dependent on which of the IFFT and FFT configurations 215a, 215b for the separator-combiner 215 is being employed. Additionally, the scaling factors provided by the first and second scaling units 420, 425 are also dependent on whether the first or second mapping strategy is being employed. Scalar exponent values $n_1$, $m_1$ and $n_2$, $m_2$ for each of these conditions are presented in Table 2, below.

TABLE 2

| DATA MAPPING | TRANS-FORM | SCALAR VALUES | | | |
|---|---|---|---|---|---|
| | | n1 | m1 | n2 | m2 |
| EVEN TO REAL | FFT | 0 | 0 | +1 | +1 |
| ODD TO IMAGINARY | IFFT | 0 | 0 | −1 | −1 |
| EVEN TO IMAGINARY | FFT | +1 | 0 | 0 | +1 |
| ODD TO REAL | IFFT | −1 | 0 | 0 | −1 |

Figure 5:
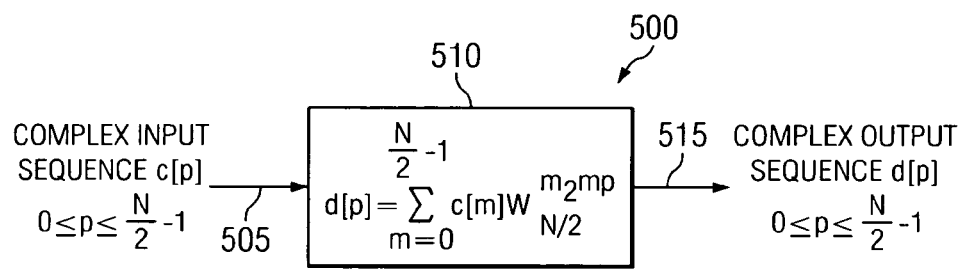
FIG. 5 illustrates a functional diagram of an embodiment of a transformation processing unit as may be associated with the separator-combiner of FIG. 2.

Turning momentarily to FIG. 5, illustrated is a functional diagram of an embodiment of a transformation processing unit, generally designated 500, as may be associated with the separator-combiner 215 of FIG. 2. The transformation processing unit 500 includes a transformation processing (TP) data input 505 coupled to a transformation unit 510 that provides a TP data output 515.

The transformation unit 510 accepts a complex input sequence c[p] on the TP data input 505 and provides a complex output sequence d[p] on the TP data output 515. If the separator-combiner 215 is employed in the IFFT configuration 215a, the complex input sequence c[p] represents complex frequency domain data Z [k], and the complex output sequence d [p] represents complex time domain data z[n] as denoted in FIG. 2. The transformation unit 510 is associated with equation (7) for the first mapping strategy and with equation (14) for the second mapping strategy, as discussed with respect to FIG. 1.

If the separator-combiner 215 is employed in the FFT configuration 215b, the complex input sequence c[p] represents complex time domain data z [n], and the complex output sequence d [p] represents complex frequency domain data Z[k] as denoted in FIG. 2. The transformation unit 510 is associated with equation (2) for the first mapping strategy and with equation (9) for the second mapping strategy, as discussed with respect to FIG. 1. The transformation unit 510 also employs the scalar exponent value $m_2$, whose value is denoted in Table 2, above.

Returning now to FIG. 2, an embodiment of the FFT/IFFT processor 200 has been presented that advantageously provides an enhanced operational capability by reducing the number of complex multiplications required to accomplish IFFT and FFT calculations. Assuming a radix-2 butterfly FFT/IFFT implementation that employs $(N/2)*\log_2(N)$ complex multiplications, Table 3 provides a comparison of the number of complex multiplications required to accomplish FFT/IFFT conversions employing the FFT/IFFT processor 200.

TABLE 3

| | FFT/IFFT SIZE | | | | | |
|---|---|---|---|---|---|---|
| DATA MAPPING | 64 | 128 | 256 | 512 | 1024 | 2048 |
| NO MAPPING | 192 | 448 | 1024 | 2304 | 5120 | 11264 |
| EVEN TO REAL ODD TO IMAGINARY | 112 | 256 | 576 | 1280 | 2816 | 6144 |
| EVEN TO IMAGINARY ODD TO REAL | 144 | 320 | 704 | 1536 | 3328 | 7168 |

The first mapping strategy (even to real, odd to imaginary) provides a first reduction in complex multiplications of about 40 to 45 percent when compared to the no mapping case. The second mapping strategy (even to imaginary, odd to real) provides a second reduction of about 25 to 35 percent compared to the no mapping case. Each of these first and second reductions reduces both processing time and integrated circuit real estate requirements.

Figure 6:
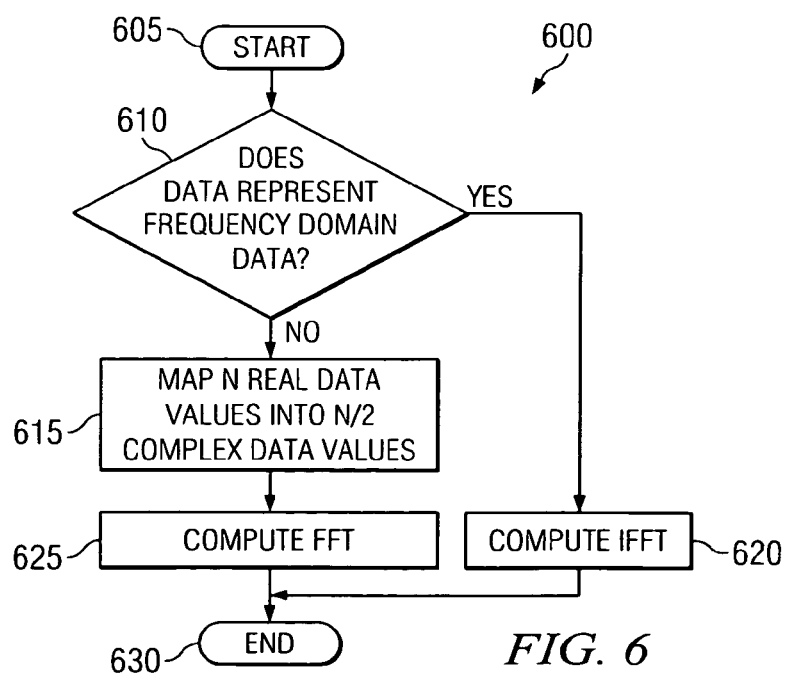
FIG. 6 illustrates a flow diagram of an embodiment of a method of FFT/IFFT processing carried out in accordance with the principles of the present invention.

Turning now to FIG. 6, illustrated is a flow diagram of an embodiment of a method of FFT/IFFT processing, generally designated 600, carried out in accordance with the principles of the present invention. The method 600 starts in a step 605 with an intent to provide an FFT or an IFFT conversion employing N data values. In a decisional step 610, it is determined whether the N data values are complex and represent frequency domain data. If a frequency domain data representation is determined in the decisional step 610, an IFFT is computed employing N/2 complex frequency domain data values, in a step 620. Computing the IFFT employs a separation-combination process and then a transformation process, and the method 600 ends in a step 630.

If it is determined that the N data values do not represent frequency domain data in the decisional step 610, the N data values are real and represent time domain data. The N real data values are organized into N/2 real value sets having N/2 even portions and corresponding N/2 odd portions. Then in a step 615, these N/2 even and odd value sets are mapped into N/2 mapped complex data values employing either a first or a second data mapping strategy.

In the first data mapping strategy, the N/2 even portions of the real value sets are mapped into corresponding N/2 real parts of N/2 mapped complex data values, and the N/2 odd portions of the real value sets are mapped into corresponding N/2 imaginary parts of the N/2 mapped complex data values in the step 615. Alternately, the second data mapping strategy may be employed to map the N/2 even portions of the real value sets into corresponding N/2 imaginary parts of the N/2 mapped complex data values, and the N/2 odd portions of the real value sets into corresponding N/2 real parts of the N/2 mapped complex data values in the step 615.

Then, an FFT is computed in a step 625 employing the N/2 mapped complex data values. Computing the FFT employs the transformation process and then the separation-combination process. The method again ends in the step 630.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

In summary, embodiments of the present invention employing an FFT/IFFT processor, a method of FFT/IFFT processing and an FFT/IFFT processing system have been presented. Advantages include a reduction in operational complexity based on the ability to map N real data values into N/2 complex data values and to use N/2 point FFT or IFFT structures to provide an N point FFT or IFFT computation. Complex multiplications and storage requirements are substantially reduced thereby providing more efficient and effective computations for N point conversions. Additionally, transformation operations for FFT and IFFT conversions are combined into one function thereby saving valuable programming space.

Although the present invention has been described in detail, those skilled in the art should understand that they can make various changes, substitutions and alterations herein without departing from the spirit and scope of the invention in its broadest form.

What is claimed is:

1. A computer-implemented FFT/IFFT processing system, comprising:
 a memory having N data values that are either real or complex values, wherein said real values represent time-domain data and said complex values represent frequency-domain data; and
 an FFT/IFFT processor coupled to said memory, including:
  an even-odd data mapper that provides a mapping of said N data values into N/2 mapped complex data values if said N data values are real, and a separator-combiner, coupled to said even-odd data mapper, that computes either an FFT for said N data values that are real based on said mapping or computes an IFFT for said N data values that are complex based on N/2 of said complex data values.

2. The system as recited in claim 1 wherein said mapping respectively allocates N/2 even and odd value sets of said N data values into N/2 real and imaginary parts of said N/2 mapped complex data values.

3. The system as recited in claim 1 wherein said mapping respectively allocates N/2 even and odd value sets of said N data values into N/2 imaginary and real parts of said N/2 mapped complex data values.

4. The system as recited in claim 1 wherein said time domain data represents data received via a digital communications system.

5. The system as recited in claim 1 wherein said frequency domain data represents data to be transmitted via a digital communications system.

6. The system as recited in claim 1 wherein said separator-combiner employs a first set of complex scalar values for said FFT and a second set of complex scalar values for said IFFT.

7. The system as recited in claim 1 wherein said separator-combiner includes a separation-combination processing unit and a transformation processing unit.

* * * * *